3,277,028
RIGID OR SEMI-RIGID CELLULAR MATERIALS
Robert Sydney Richard Parker, Dartford, Kent, and Percy Taylor, Epping, Essex, England, assignors to Pneumatiques, Caoutchouc Manufacture et Plastiques Kleber-Colombes, Colombes, Seine, France, a corporation of France
No Drawing. Filed June 4, 1964, Ser. No. 372,669
14 Claims. (Cl. 260—2.5)

The present invention relates to an improved process for the production of a rigid or semi-rigid cellular material based on a polymer or copolymer of vinyl chloride, i.e. having an amount of a polymer or copolymer of vinyl chloride that is larger than the amount of any other constituent. The conventional processes for the production of foamed polyvinyl chloride have produced cellular material which has wide application but in many instances lacks certain physical properties, for example, dimensional and heat stability, which are desirable. In an attempt to improve the mechanical and chemical properties of the product of the conventional processes, the starting materials have been modified and the cellular material produced has shown improved properties, for example, resistance to chemical attack, and reduced shrinkage but the processes themselves have been difficult to carry out in view of the fire and toxic problems introduced by the new starting materials. Thus in a preferred process which has hitherto been adopted for the production of improved cellular material a mixture of polyvinyl chloride, maleic anhydride, a vinylidenic compound containing the characteristic group $CH_2=C<$, acrylonitrile, toluene-di-isocyanate and a blowing agent such as azo-di-isobutylronitrile has yielded a satisfactory product when subjected first to a temperature of about 130° C. under pressure in a mould and after the reaction has proceeded, at a temperature of 180° C. to produce the gelation of the polyvinylchloride, the expansion has been achieved by heating the product in the presence of water or water vapour. Although this process has produced an improved product, it suffers from certain defects in that the vinylidenic compounds such as styrene and acrylonitrile have introduced serious toxic and fire problems and it is therefore an object of the present invention to overcome to a large extent these problems by replacing at least part of the toxic or inflammable material by other suitable monomers. It is a further object of the present invention to yield a rigid or semi-rigid cellular material of low bulk density, high compressive strengths, particularly at moderate or high temperatures, good thermal conductivity, improved resistance to humid aging and other favourable physical and chemical properties.

According to the present invention, a process for the production of a rigid or semi-rigid cellular material comprises the steps of first mixing a polymer or copolymer of vinyl chloride, a polyisocyanate, a blowing agent, an unsaturated anhydride and an unsaturated hydrocarbon containing either one or two cyclenic double bonds, as hereinafter described, heating the mixture in a mould under pressure, subsequently cooling the mould under pressure then removing the partially expanded material and achieving the expansion by heating the material produced in the presence of water or water vapour. Although it is an object of the present invention to reduce substantially the fire and toxic hazards of the processes hitherto used for the production of cellular material, if adequate precautions are taken, certain amounts of styrene and acrylonitrile may be introduced as additional components in the mixture used in accordance with the present invention.

The process according to the present invention may be carried out by mixing the components to a pasty consistency and, after any other desired components have been added such as stabilisers, plasticisers, solvents, fillers and pigments, charging the mixture into a mould and heating under pressure greater than atmospheric, for example, of the order of 3 to 7 tons per square inch, to a temperature up to about 130° C. to decompose the blowing agent, subsequently heating to a temperature up to about 180° C. to gel the polymer. The product is then cooled and released from the press. The cooled product is then reheated to achieve the expansion in the presence of water or water vapour preferably by the immersion of the material in water at a temperature of about 95° C. when the polyisocyanate and anhydride react with the water and the expansion is completed after a period of about 90 minutes. Alternatively the process may be carried out by mixing the polyisocyanate, the unsaturated hydrocarbon containing one or two cyclenic double bonds and maleic anhydride in a stainless steel tank with a stirrer, heated to a temperature within the range of 30 to 35° C. in a waterbath and then feeding the solution to a ribbon mixer containing powdered vinyl chloride polymer or copolymer and blowing agent. After a few minutes of thorough mixing, the resultant paste is introduced into an extruder and a ribbon of the material is extruded, cut into suitable lengths and placed in a mould which is then inserted in the press and the platens are heated to a temperature within the range of 150 to 180° C. when the gelation occurs. After the moulded blocks have been cooled, they are placed in water at a temperature of about 95° C. when the polyisocyanate reacts with the water and the expansion is taken to achievement.

The polyisocyanate used in accordance with the present invention is generally present in an amount within the range of 0.5 to 60 percent, preferably 5 to 50 percent by weight of the initial mixture. Examples of suitable polyisocyanates which may be used in the process are p-p'-p''-tri-isocyanate of triphenyl methane, a di-isocyanate of diphenyl methane such as p-p'-diphenyl methane di-isocyanate or a di-isocyanate of benzene or its homologues such as tolylene 2-4-di-isocyanate of toluene 2-6-di-isocyanate or polyisocyanates such as polymethylene polyphenylisocyanate. The polyisocyanates preferred according to the process of the present invention are aromatic di-isocyanates. The amount of blowing agent used depends on the extent of expansion required but is generally within the range of 0.5 to 20 percent by weight, preferably 1 to 10 percent by weight of the initial mixture and may have in addition a secondary blowing agent such as a fluorocarbon. Examples of suitable blowing agents which may be used in the process according to the present invention are irreversibly gas releasing agents under heating between 80 and 200° C. such as azo-compounds, for example azo-di-isobutyric dinitrile, azo-di-isobutyric amide-oxime, and azo-amides, for example azo-dicarbonamide; sulphonylhydrazides, for example p,p¹-oxybis (benzene sulphonyl hydrazide) and benzene sulphonyl hydrazine; hydrazones, for example benzil hydrazones; organic nitrites, for example tertiary butylamine nitrile; N-nitroso compounds, for example N:N¹-dinitrosoethyleneurea, N:N¹-dinitroso-N:N¹-dimethylterephthal-amide and N:N¹-dinitroso-pentamethylene tetramine; ureas and salts of ureas, for example urea oxalate; and substituted ureas and salts of substituted ureas, for example amino-guanidine bicarbonate and nitrourea. The unsaturated anhydrides which are used in the present invention must be capable of copolymerising with the other components and although the amount used depends on the desired density for the final product it is generally within the range of 5 to 40 percent by weight of the initial mixture. The preferred anhydride according to the process of the present invention is ethylenic anhydride of a mono- or polycarboxylic acid, and this anhydride may be used by itself or as a mixture of two or more anhydrides, maleic anhydride, cinnamic anhydride, itaconic anhydride, acrylic anhydride and citraconic anhydride being examples of suitable compounds.

The unsaturated hydrocarbon containing either one or two cyclenic double bonds which are used in the process according to the present invention are preferably liquid and since they normally tend to yield non-reactive polymers they contribute to the stability of the grafted polymer produced in the process of the invention, these hydrocarbons may be monocyclic or polycyclic and contain saturated side chains but they have to contain one or two cyclenic double bonds.

Examples of such hydrocarbons are cyclo-pentene, cyclohexene, cycloheptene, cyclooctene, cyclopentadiene, dicyclopentadiene, cyclohexadiene, cycloheptadiene, 1-5-cyclooctadiene; their alkyl derivatives for example methylisopropyl cyclopentenes, dimethylcyclohexenes; $\alpha_5$ and $\gamma$-terpinene, $\alpha$-phellandrene, methyl-3-p-menthadiene 1-3, pinene, 2-bornene.

The preferred compounds are unsaturated hydrocarbons containing two cyclenic double bonds such as cyclopentadiene, dicyclopentadiene, and 1-5-cyclooctadiene, because the resulting rigid cellular materials have the most satisfactory ratios of bulk density to compressive strength. The amount of the unsaturated hydrocarbon used is generally with in the range of from 2 to 30 percent preferebly 7 to 20 percent by weight of the initial mixture and the hydrocarbons may be used in the form of a mixture of two or more of the monomers described.

The process according to the present invention is further illustrated with reference to the following example in which the parts of the components represent parts by weight of the initial mixture used:

Example 1

A mixture of 48.5 parts of tolylene di-isocyanate, 14.5 parts of cyclohexene and 37 parts of maleic anhydride were mixed in a stainless steel tank and stirred at a temperature of 30° C. until the maleic anhydride had completely dissolved. The solution was then passed to a ribbon mixed containing 100 parts of polyvinyl chloride and 5 parts p-p'-oxybis (benzene sulphonyl hydrazide). The stirring was continued for a period of about 10 minutes and the product in paste form was fed into an extruder and extruded to produce a ribbon 0.8 x 2" in cross-section. The ribbon was then cut into short lengths which were fed into a mould which was then placed in a press and the platens heated to a temperature of 180° C. The gel occurred and after cooling the moulded blocks were placed in water at a temperature above 95° C. and there the tolylene di-isocyanate reacted with the water to yield the gas which achieved the expansion in a period of about 90 minutes. Then the resultant expanded material was removed and submitted to a further heating stage in an air oven for a period of about 24 to 48 hours to remove all traces of any liquid entrained in the product. The rigid cellular material thus obtained exhibited good resistance to solvent attack, a good thermal conductivity, and substantially no shrinkage.

Example 2

The same process described in the foregoing example was applied to a mixture of 50 parts of p-p'-diphenyl methane di-isocyanate, 14.5 parts of pinene, 18 parts of maleic anhydride, 19 parts of phthalic anhydride, 100 parts of polyvinylchloride, and 4 parts of N:N¹-dinitroso-N:N¹-di-methyl-terephthalamide. Here again a rigid cellular material was obtained which exhibited an improved resistance to humid aging, no shrinkage till 100° C. and a good resistance to solvent attack.

Example 3

The same process as described in the foregoing example was applied to a mixture of 48.5 parts of tolylene di-isocyanate, 14.5 parts of cyclopentadiene, 37 parts of maleic anhydride, 100 parts of polyvinylchloride and 5 parts of azo-di-isobutyronitrile. The rigid cellular material thus obtained had a density of 53 kg./m.$^3$, a volume stability at 100° C. of 99.5% and a compressive strength of 5.9 kg./cm.$^2$ at 20° C. and 4.8 kg./cm$^2$ at 100° C.

Example 4

The same process as hereinabove described was applied to the following mixture: 48.5 parts of tolylene di-isocyanate, 14.5 parts of cyclopentadiene, 37 parts of maleic anhydride, 100 parts of polyvinylchloride, 5 parts of azobis-isobutyronitrile and 10 parts of trichloromonofluoromethane. The rigid cellular material thus obtained had a density of 42 kg./cm.$^2$, a low coefficient of thermal conductivity, a volume stability at 100° C. of 97% and a compressive strength of 4.0 kg./cm.$^2$ at 20° C. and 3.5 kg./cm.$^2$ at 100° C.

We claim:
1. In a process for the production of a rigid or semi-rigid cellular material which process comprises the steps of mixing a polymer or copolymer of vinyl chloride, a polyisocyanate, a blowing agent, an unsaturated anhydride and a vinylidenic compound, heating the mixture in a mould under pressure, cooling the mould under pressure, removing the material and finally achieving the expansion by heating the material in the presence of water or water vapour, the improvement which consists in using as the vinylidenic compound an unsaturated cyclic hydrocarbon containing 1 to 2 double bonds in the ring.

2. A process as claimed in claim 1 in which the polyisocyanate is an aromatic di-isocyanate.

3. A process as claimed in claim 2 in which the polyisocyanate is a tolylene di-isocyanate.

4. A process as claimed in claim 2 in which the polyisocyanate is a p-p'-diphenyl methane di-isocyanate.

5. A process as claimed in claim 1 in which the polyisocyanate is present in an amount within the range of 0.5 to 60 percent by weight of the mixture.

6. A process as claimed in claim 1 in which the blowing agent is an azo compound.

7. A process as claimed in claim 1 in which the blowing agent is azo-di-isobutyronitrile.

8. A process as claimed in claim 1 in which the blowing agent is a sulphonylhydrazide.

9. A process as claimed in claim 1 in which the blowing agent is a N-nitroso compound.

10. A process as claimed in claim 1 in which the unsaturated anhydride is maleic anhydride.

11. A process as claimed in claim 1 in which the unsaturated anhydride is used in an amount within the range of 5 to 40 percent by weight of the mixture.

12. A process as claimed in claim 1 in which the unsaturated cyclic hydrocarbon contains 2 double bonds in the ring.

13. A process as claimed in claim 12 in which the unsaturated cyclic hydrocarbon containing 2 double bonds in the ring is cyclopentadiene.

14. A process as claimed in claim 1 in which the unsaturated cyclic hydrocarbon containing 1 to 2 double bonds in the ring is used in an amount within the range of from 2 to 30 percent by weight of the mixture.

No references cited.

MURRAY TILLMAN, *Primary Examiner.*

M. FOELAK, *Assistant Examiner.*